United States Patent
Sato

(10) Patent No.: US 8,760,715 B2
(45) Date of Patent: Jun. 24, 2014

(54) PRINT JOB MANAGEMENT SYSTEM, PRINT JOB MANAGEMENT APPARATUS, AND PRINT JOB MANAGEMENT METHOD FOR MANAGING PRINT JOBS INCLUDING ACQUIRING PROCESS COMPLETION TIME AND DISPLAYING INFORMATION REGARDING PROCESSING COMPLETION TIME FOR EACH OF IMAGE FORMING APPARATUSES AS A LIST

(75) Inventor: Kazuhiko Sato, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 468 days.

(21) Appl. No.: 13/043,766

(22) Filed: Mar. 9, 2011

(65) Prior Publication Data

US 2011/0242557 A1 Oct. 6, 2011

Related U.S. Application Data

(60) Provisional application No. 61/318,862, filed on Mar. 30, 2010.

(51) Int. Cl.
 G06F 3/12 (2006.01)
 G06K 15/00 (2006.01)
 H04N 1/00 (2006.01)
 H04N 1/60 (2006.01)

(52) U.S. Cl.
 USPC ........... 358/1.9; 358/1.1; 358/1.15; 358/1.16; 358/1.6

(58) Field of Classification Search
 USPC ............... 358/1.9, 1.1, 1.15, 1.16, 1.13, 3.24, 358/3.22, 3.23, 501, 508, 540, 401; 399/81, 399/43, 46, 50, 77, 82, 158, 168, 365; 709/250, 239, 201, 217; 707/634, 636, 707/600
 See application file for complete search history.

(56) References Cited

U.S. PATENT DOCUMENTS

| | | | | |
|---|---|---|---|---|
| 7,161,696 B2* | 1/2007 | Yamamoto et al. | ........... | 358/1.15 |
| 7,817,292 B2* | 10/2010 | Fujii | ............ | 358/1.15 |
| 2001/0048533 A1* | 12/2001 | Koana | ........... | 358/1.15 |
| 2007/0188791 A1* | 8/2007 | Utsunomiya et al. | ........ | 358/1.13 |
| 2008/0180707 A1* | 7/2008 | Kanematsu | ............ | 358/1.9 |
| 2008/0186543 A1* | 8/2008 | Harigae | ............ | 358/3.24 |
| 2010/0238484 A1* | 9/2010 | Komine | ............ | 358/1.15 |

FOREIGN PATENT DOCUMENTS

| | | |
|---|---|---|
| JP | 11-134119 | 5/1999 |
| JP | 2007-044917 | 2/2007 |
| JP | 2008-257376 | 10/2008 |

* cited by examiner

*Primary Examiner* — Ngon Nguyen
(74) *Attorney, Agent, or Firm* — Amin, Turocy & Watson, LLP

(57) ABSTRACT

A print job management system according to an embodiment has a transmission unit, a time calculation unit, and a list display unit. The transmission unit transmits a print job. The time calculation unit acquires the print job transmitted from the transmission unit and calculates a processing completion time taken for each of a plurality of image forming apparatuses to complete a process for the print job for each of the image forming apparatuses. The list display unit acquires the process completion time for each of the image forming apparatuses calculated by the time calculation unit and displays information regarding the processing completion time for each of the image forming apparatuses as a list.

18 Claims, 10 Drawing Sheets

Fig.4

```
PERFORMANCE DATA OF MFP300A
COLOR :      A4 SINGLE-SIDED  1.2 SEC/1 SHEET,    A4 TWO-SIDED  2 SEC/1 SHEET,
             A3 IS 1.1 TIMES A4
MONOCHROME : A4 SINGLE-SIDED  1.0 SEC/1 SHEET,    A4 TWO-SIDED  1.7 SEC/1 SHEET,
             A3 IS 1.1 TIMES A4
AVERAGE TIME INTERVAL BETWEEN JOBS 0.8 SEC
```

Fig.5

| ORDER | DEVICE NAME | WAITING TIME | REQUIRED TIME | TOTAL |
|---|---|---|---|---|
| 4 | MFP300 A | 1 MIN 55 SEC | 2 MIN 00 SEC | 3 MIN 55 SEC |
| 1 | MFP300 B | 0 MIN 17 SEC | 1 MIN 44 SEC | 2 MIN 01 SEC |
| 3 | MFP300 C | 2 MIN 10 SEC | 1 MIN 44 SEC | 3 MIN 25 SEC |
| 2 | MFP300 D | 1 MIN 07 SEC | 1 MIN 44 SEC | 2 MIN 51 SEC |
| 5 | MFP300 E | 2 MIN 20 SEC | 1 MIN 30 SEC | 3 MIN 50 SEC |

WAITING TIME LIST FOR EACH MFP (PAGE 1 / 1)   UPDATE

← LOW-SPEED DEVICE

} INTERMEDIATE-SPEED DEVICE

← HIGH-SPEED DEVICE

PAGE SWITCHING   ▲ ▼   SELECT   CANCEL

SELECT MFP AND PRESS [SELECT] (TRANSITION TO FIG. 6)

Fig.6

| [MFP300B] WAITING TIME LIST (PAGE 1 / 1) | | | | | | UPDATE | ← PRESS [UPDATE] AND CALCULATE TIME AGAIN |
|---|---|---|---|---|---|---|---|
| USER NAME | DOCUMENT NAME | SHEET | PAGE | NUMBER OF COPIES | TOTAL | REQUIRED TIME | |
| TOTAL WAIT | | | | | 13 SHEETS | 17 SEC | ← TOTAL PRINTINGS REGISTERED A) |
| ☐ USER 01 | EXAMINATION TABLE -1.xls | A4R | 6 | 5 | 30 | 30 | |
| ☑ USER 01 | CONFERENCE MATERIAL A.doc | A4 | 2 | 5 | 10 | 10 | |
| ☑ USER 01 | CONFERENCE MATERIAL B.doc | A4 | 5 | 5 | 25 | 25 | DISPLAY TOTAL TIME OF SELECTED JOBS B) |
| ☑ USER 01 | CONFERENCE MATERIAL C.doc | A4 | 5 | 5 | 25 | 25 | |
| ☐ USER 01 | SUPPORT MATERIAL.doc | A3 | 3 | 5 | 15 | 20 | |
| | | | | | | | |
| TOTAL SELECTED | | | | | 60 SHEETS | 1 MIN 00 SEC | ← TOTAL PRINTING TIME A+B) |
| TOTAL TIME | | | | | 73 SHEETS | 1 MIN 17 SEC | |

PAGE SWITCHING ▲ ▼   CONFIRM   CANCEL

PRINT JOB MANAGEMENT SYSTEM, PRINT JOB MANAGEMENT APPARATUS, AND PRINT JOB MANAGEMENT METHOD FOR MANAGING PRINT JOBS INCLUDING ACQUIRING PROCESS COMPLETION TIME AND DISPLAYING INFORMATION REGARDING PROCESSING COMPLETION TIME FOR EACH OF IMAGE FORMING APPARATUSES AS A LIST

CROSS-REFERENCE TO RELATED APPLICATION

This application is based upon and claims the benefit of priority from U.S. provisional application 61/318,862, filed on Mar. 30, 2010; the entire contents of which are incorporated herein by reference.

FIELD

Embodiments described herein relate generally to a technique for managing print jobs.

BACKGROUND

In a printing system including one or a plurality of MFPs (Multi-Function Peripherals) which are image forming apparatuses and a plurality of PCs (Personal Computers) used by users, management of print jobs is performed by a print server or the MFPs. The print server or the MFPs have a function of displaying a list of print jobs that are waiting to be processed. However, the print server or the MFPs according to the related art do not display predicted times taken to actually perform printing although they can display the list of the print jobs. Therefore, there is a problem that the user cannot ascertain when processing of a transmitted print job will be terminated.

DESCRIPTION OF THE DRAWINGS

FIG. 4 is a diagram illustrating an example of performance data of an MFP.

FIG. 5 is a diagram illustrating an example of a list displaying a waiting time for each MFP.

FIG. 6 is a diagram illustrating an example of a list displaying a waiting time for each print job of an MFP.

DETAILED DESCRIPTION

A print job management system according to this embodiment has a transmission unit, a time calculation unit, and a list display unit. The transmission unit transmits a print job. The time calculation unit acquires the print job transmitted from the transmission unit and calculates a processing completion time taken for each of a plurality of image forming apparatuses to complete a process for the print job for each of the image forming apparatuses. The list display unit acquires the process completion time for each of the image forming apparatuses calculated by the time calculation unit and displays information regarding the processing completion time for each of the image forming apparatuses as a list.

Hereinafter, embodiments will be described with reference to the drawings. In addition, in the following description, when apparatuses are distinguished in the description, reference symbols with alphabetic characters such as PC 100A and MFP 300B are used, and when the apparatuses do not need to be distinguished in the description, reference symbols without alphabetic characters attached such as PC 100 and MFP 300 are used.

First Embodiment

Figure 1:
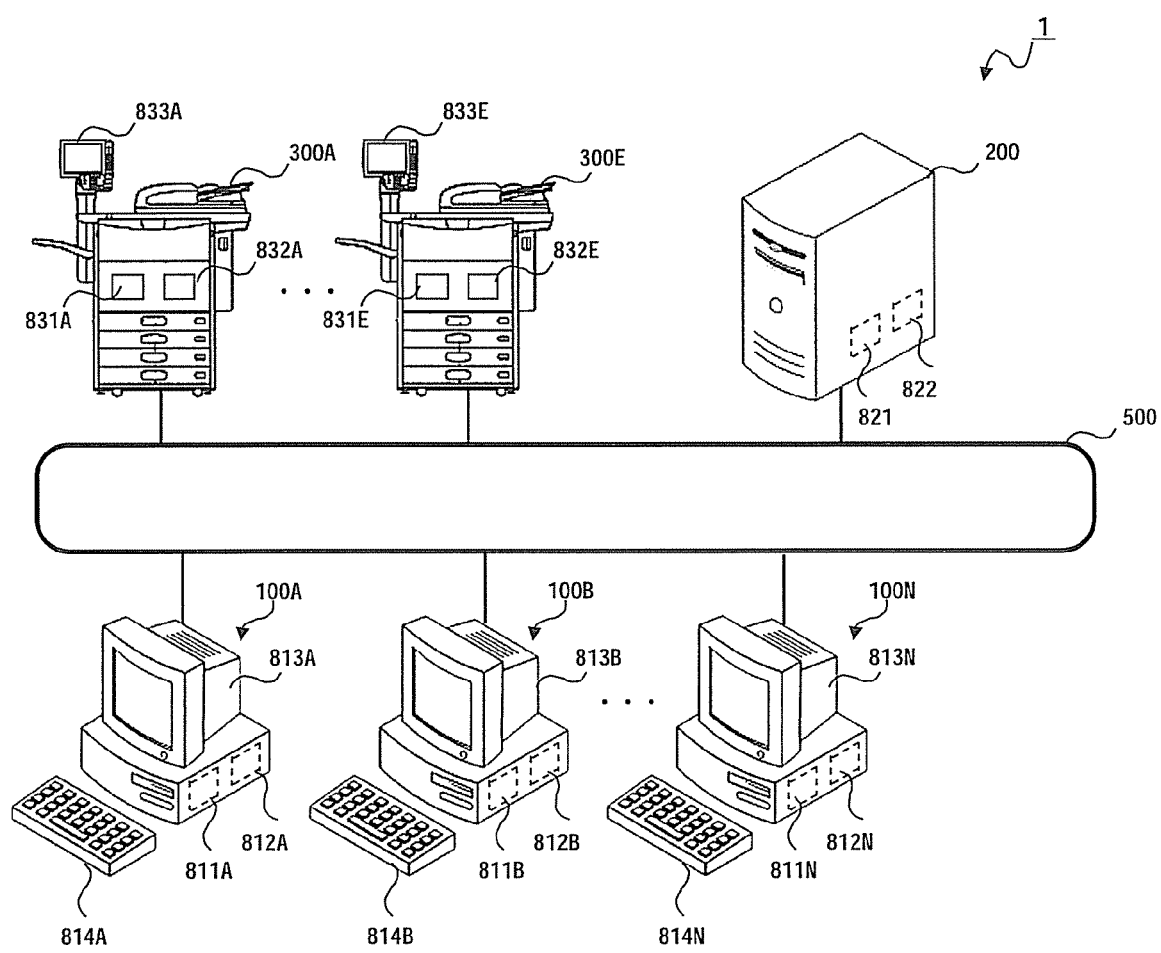
FIG. 1 is a diagram illustrating the hardware configuration of a print job management system according to a first embodiment.

FIG. 1 illustrates the configuration of a print job management system according to a first embodiment. The print job management system 1 has a plurality of PCs 100 (100A to 100N), a print server 200, and a plurality of MFPs 300 (MFPs 300A to 300E).

The PC 100 is a client computer used by a user. The PC 100 has a processor 811 which is a CPU (Central Processing Unit) or an MPU (Micro Processing unit) and a memory 812 configured as a volatile storage device or a non-volatile storage device. The PC 100 has a display unit 813 that displays an image for the user and an operation input unit 814 which receives an input from the user.

The display unit 813 may be configured as, for example, an electronic sheet of paper, an LCD (Liquid Crystal Display), an EL (Electronic Luminescence), a PDP (Plasma Display Panel), a CRT (Cathode Ray Tube), or the like. The operation input unit 814 may be configured as, for example, a keyboard, a mouse, a touch panel, a touch pad, a graphics tablet, a dedicated button, or the like.

The print server 200 is a computer that manages print jobs and has a processor 821 which is a CPU or an MPU and a memory 822 configured as a volatile storage device or a non-volatile storage device.

The MFP 300 has a function of printing electronic data on a sheet, a function of scanning a sheet to generate electronic data, and a function of transmitting and receiving data printed on a sheet or electronic data using a fax. The MFP 300 has a processor 831 which is a CPU or an MPU and a memory 832 configured as a volatile storage device or a non-volatile storage device. The MFP 300 has a control panel 833 which is an input and output unit for showing a display for the user and receiving an input from the user.

The PCs 100, the print server 200, and the MFPs 300 are connected via a network 500 so as to communicate with each other.

The memories 812, 822, and 832 may be configured as RAMs (Random Access Memory), ROMs (Read Only Memory), DRAMs (Dynamic Random Access Memory), SRAMs (Static Random Access Memory), VRAMs (Video RAMs), flash memories, hard disk drives, and the like and have a role of storing various kinds of information and programs.

Figure 2:
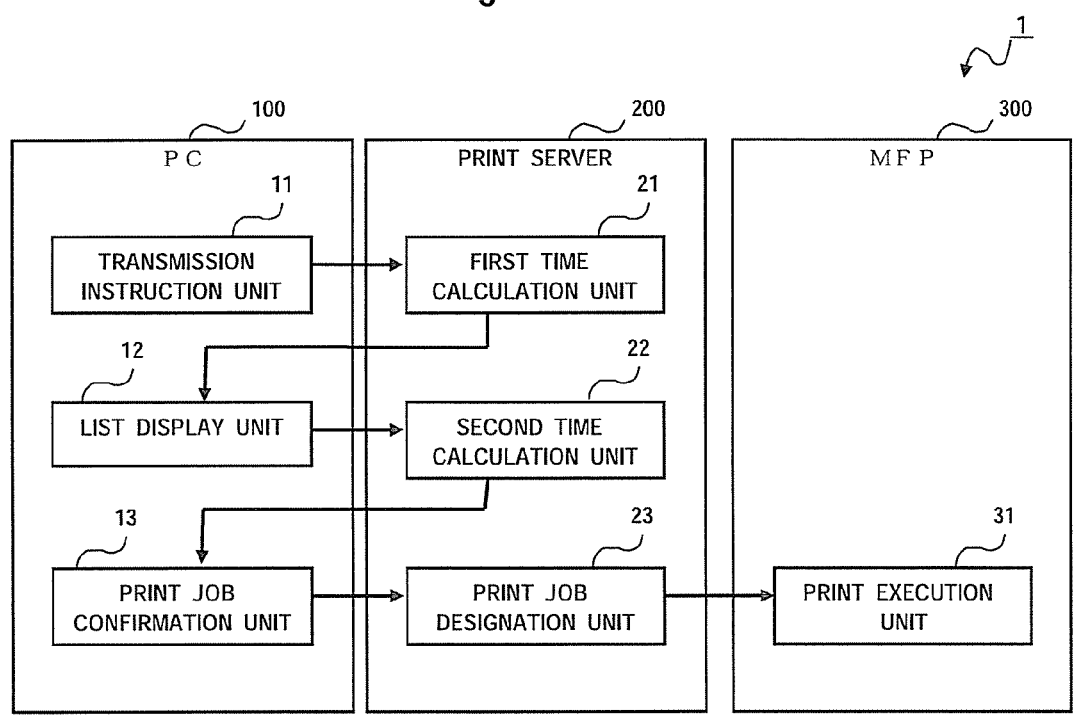
FIG. 2 is a block diagram of the print job management system according to the first embodiment.

A block diagram showing an example of the configuration of the print job management system is illustrated in FIG. 2.

The PC 100 has a transmission instruction unit 11, a list display unit 12, and a print job confirmation unit 13. The print server 200 has a first time calculation unit 21, a second time calculation unit 22, and a print job designation unit 23. The MFP 300 has a print execution unit 31.

Each block illustrated in FIG. 2 is realized as programs installed in advance on a non-volatile storage area of the memory provided in each of the apparatuses are loaded on a volatile storage area and processors execute operations. The transmission instruction unit 11, the list display unit 12, and the print job confirmation unit 13 are realized to include hardware resources of the display unit 813 and the operation input unit 814.

Operations of the print job management system 1 will be described with reference to a flowchart of FIG. 3. It is assumed that the user uses the PC 100A.

The transmission instruction unit 11 of the PC 100A transmits a print job desired by the user or a server access such as a confirmation instruction of a print job to the print server 200 (ACT 1). The first time calculation unit 21 of the print server 200 that receives the print job or the server access collects information on waiting states of jobs from each of the MFPs 300A to 300E (ACT 2). The information on waiting states of jobs is information on, for example, a print sheet size, distinction between single-sided printing and two-sided printing, distinction between color printing and monochrome printing, and the number of print copies, for each of jobs queued in each of the MFPs 300A to 300E.

The first time calculation unit 21 calculates a waiting time (a processing completion time of print jobs already queued) of each of the MFPs 300A to 300E (ACT 3). The memory 822 of the print server 200 holds performance data shown as an example of FIG. 4 in which a processing time per unit number of sheets is defined for each of the MFPs 300A to 300E. The performance data distinguishes between color printing and monochrome printing.

The first time calculation unit 21 calculates a waiting time of each of the MFPs 300A to 300E on the basis of the performance data and the collected information on waiting states of jobs. For example, it is assumed that the waiting time of the MFP 300A is calculated as 1 minute and 55 seconds. The performance data defines the processing time for A4 size; however, coefficients are provided for sheet sizes. For example, in the case of A3 size, 1.1 times the processing time of A4 size is needed.

The first time calculation unit 21 calculates a time required from a printing start to an end of the print job transmitted from the PC 100A in ACT 1 (a processing completion time of the print job) for each of the MFPs 300A to 300E using the performance data illustrated as the example of FIG. 4, and calculates the total (a time taken until processing of the transmitted pint job is completed) which is the sum of the calculated required time and the waiting time for each of the MFPs 300A to 300E. For example, when the required time for the MFP 300A is calculated as 2 minutes and 0 seconds, since the total of the MFP 300A is the sum of the waiting time and the required time, the total is 3 minutes and 55 seconds.

The first time calculation unit 21 replies to the PC 100A with the calculated waiting times of the MFPs 300A to 300E, the required time for the transmitted print job, and the total.

The list display unit 12 of the PC 100A writes a list of the received waiting time, the required time for the transmitted print job, and the total for the MFPs 300A to 300E and displays the list (ACT 4). The list image is shown in FIG. 5. The list display unit 12 displays the list image by sorting the MFPs 300A to 300E depending on the processing speed. If an "Update" button on the list image is pressed (ACT5, update), the first time calculation unit 21 of the print server 200 performs the processes of ACT 2 and ACT 3 again and the list display unit 12 updates its display.

The user selects the MFP (displayed to be reversed out) such as the MFP having the shortest waiting time or the shortest total to perform the print job from the MFPs 300A to 300E on the list image shown as the example of FIG. 5 and presses a "Select" button. In the description, it is assumed that the MFP 300B is selected. The list display unit 12 detects that "Select" button is pressed (ACT 5, MFP selection confirmation) and transmits identification information on the MFP 300B to the print server 200.

The second time calculation unit 22 of the print server 200 acquires the identification information on the MFP 300B and collects job states of the MFP 300B (ACT 6). The second time calculation unit 22 calculates the time required for the print job transmitted in ACT 1 on the basis of the performance data of the MFP 300B (ACT 7). When there is a plurality of print jobs transmitted in ACT 1, the second time calculation unit 22 calculates a time required for each of the print jobs. The second time calculation unit 22 transmits each of the calculated values to the PC 100A.

The print job confirmation unit 13 of the PC 100A acquires each of the values transmitted from the second time calculation unit 22 and respectively displays waiting times of the print jobs as a list (ACT 8). An example of the displayed list is shown in FIG. 6.

The print job confirmation unit 13 displays identification names of users who transmit print jobs (User names), document names, sheet sizes (Sheet), the number of print pages (Pages), the number of print copies (Number of copies), the sum of sheets to be printed (Sum), and required times for each of the print jobs as a list. When the print jobs are selected by checking checkboxes, the print job confirmation unit 13 aggregates the sum of copies of the selected print jobs as needed and calculates the sum of required times as needed so as to be displayed in predetermined fields.

If the print jobs are selected by the user and a "Confirm" button is pressed (ACT 9, print job confirmation), the print job confirmation unit 13 transmits the identification information on the print jobs selected by the user to the print server 200. The print job designation unit 23 of the print server 200 acquires the identification information on the print jobs and transmits the print jobs designated by the user in ACTs 8 and 9 to the MFP 300B designated in ACT 5 (ACT 10). The print execution unit 31 of the MFP 300B prints electronic data according to the sheet size, the number of copies, and the number of pages defined for the acquired print job.

The print job designation unit 23 may be mounted to transmit the print job to the MFP selected from the list displayed on the list display unit 12. In this case, the processes of ACTs 6 to 9 are not performed. That is, the MFP is selected from the list displayed on the list display unit 12 (ACT 5), and the print job designation unit 23 transmits the print job transmitted in ACT 1 to the MFP selected in ACT 5 (ACT 10).

Second Embodiment

According to a second embodiment, after the user transmits the print job from the PC to the MFP, the user moves to an installation place of the MFP to cause a touch panel display of the MFP to display the print job in a list and designate the print job.

Figure 7:
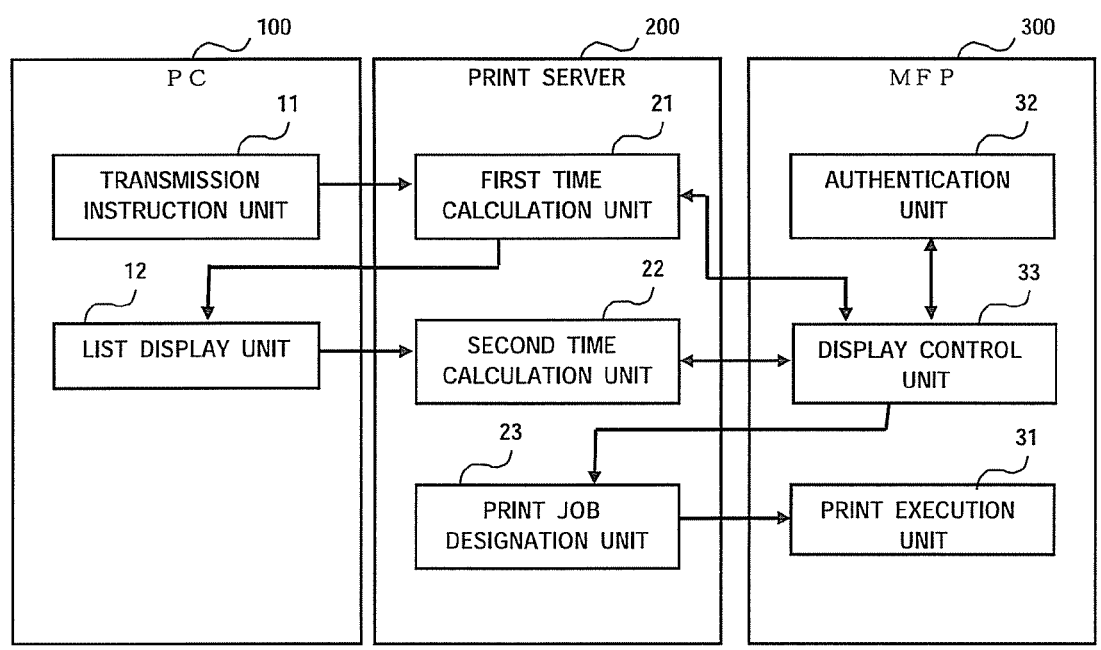
FIG. 7 is a block diagram of a print job management system according to a second embodiment.

A block diagram of the second embodiment is shown in FIG. 7. The MFP 300 according to the second embodiment is configured to include an authentication unit 32 and a display control unit 33 in the MFP 300 according to the first embodiment. The authentication unit 32 authenticates whether or not the user is a user authorized to use the MFP 300 by acquiring an account name of the user or password from the control panel 833, or causing an IC card that stores identification information on the user to be read by a card reader.

The display control unit 33 is a unit having the same functions as those of the list display unit 12 and the print job confirmation unit 13 of the first embodiment to receive an instruction from the user via the control panel 833 and display various kinds of data on the control panel 833. Blocks other than the authentication unit 32 and the display control unit 33 have the same functions as those according to the first embodiment except for data acquisition sources.

In the configuration of the example of FIG. 7, the print job confirmation unit 13 according to the first embodiment is excluded from the PC 100. However, as in the first embodiment, a configuration in which the print job confirmation unit 13 is included in the PC 100 may also be employed.

Figure 8:
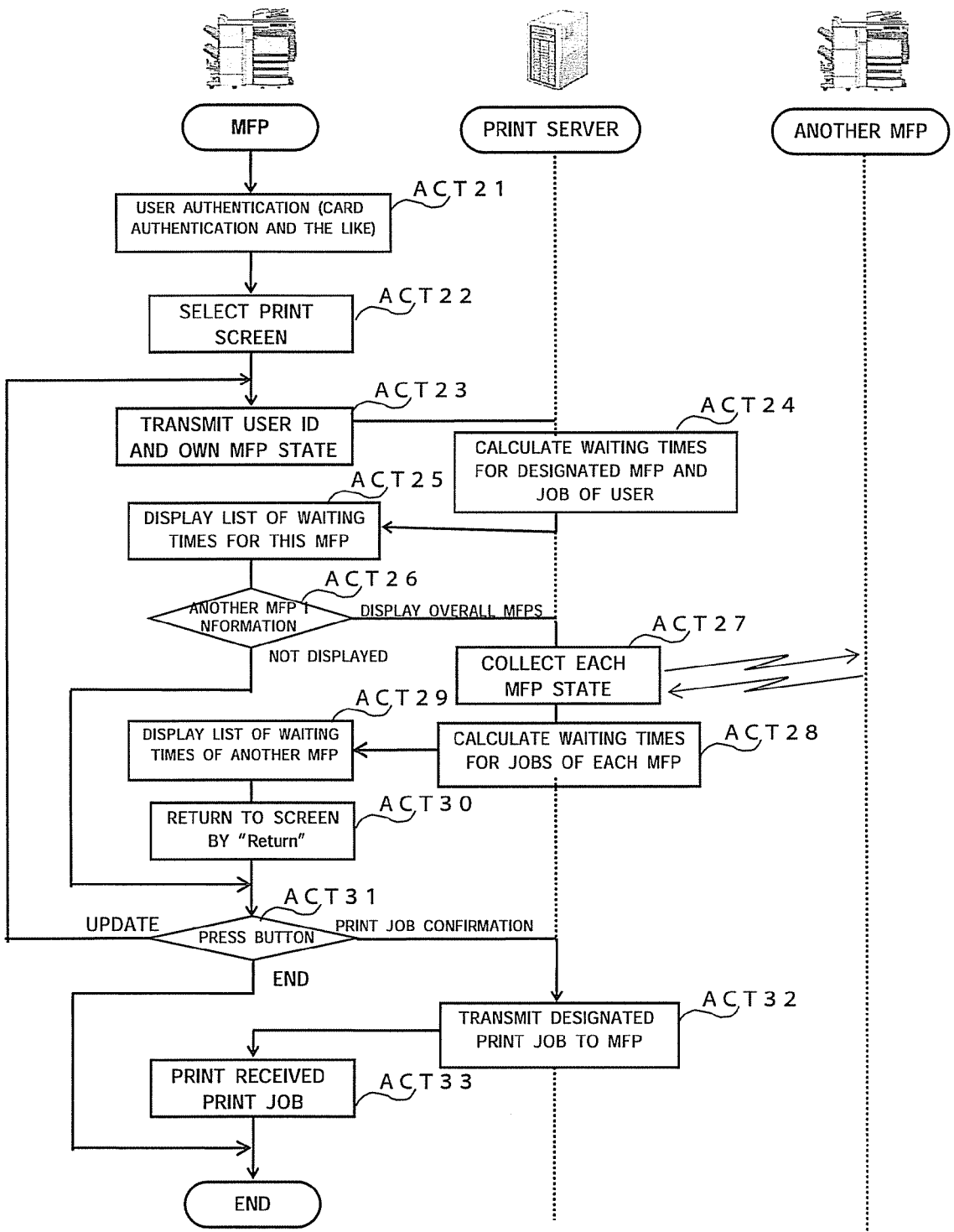
FIG. 8 is a flowchart showing an example of operations of the print job management system according to the second embodiment.

FIG. 8 is a flowchart showing an example of operations of the second embodiment. In the flowchart of FIG. 8, it is assumed that the processes of ACTs 1 to 4 described in the first embodiment, that is, the processes performed by the transmission instruction unit 11, the first time calculation unit 21, and the list display unit 12 are terminated.

After the list display unit 12 of the PC 100 displays the list of FIG. 5, the user moves to the installation place of the MFP desired by the user to execute the transmitted print job. In this embodiment, selection of the MFP is not performed. The MFP desired to execute the print job is assumed to be the MFP 300B for the description.

The authentication unit 32 of the MFP 300B executes a user authentication process (ACT 21). The MFP 300B sets modes for printing from among execution modes for scanning, FAX transmission, and printing in response to a predetermined operation of the user (ACT 22).

The display control unit 33 of the MFP 300B transmits an instruction to acquire identification information on the user and its own job states to the print server 200 (ACT 23). The second time calculation unit 22 of the print server 200 that acquires the instruction collects the states of the MFP 300B that has the instruction, and calculates a required time for each transmitted print job (ACT 24).

Figure 3:
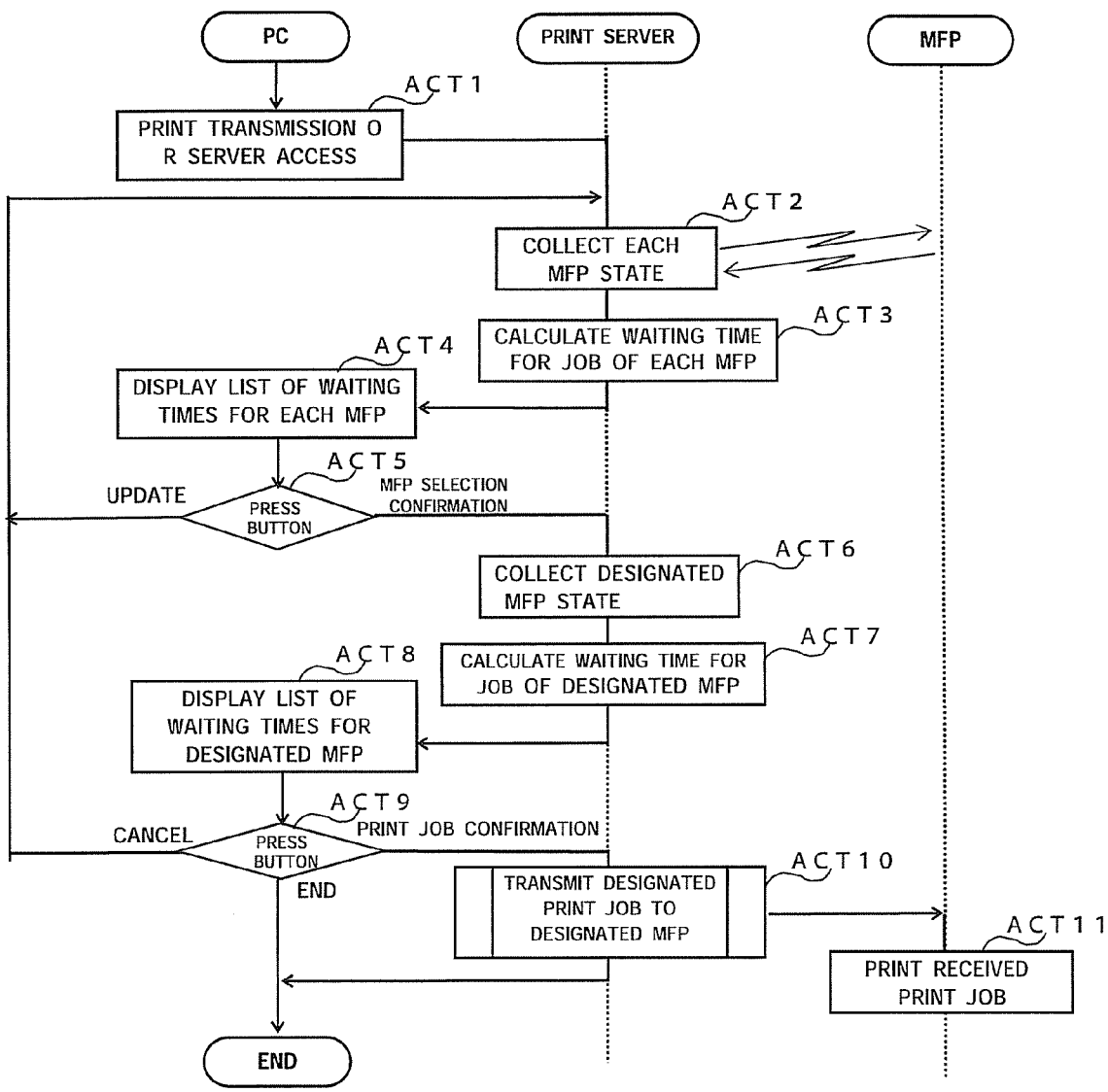
FIG. 3 is a flowchart showing an example of operations of the print job management system according to the first embodiment.

The process of ACT 24 is the same as those of ACTs 6 and 7 of the first embodiment (FIG. 3). The second time calculation unit 22 transmits the calculated required time for each print job to the MFP 300B. The display control unit 33 of the MFP 300B displays the list shown as the example of FIG. 6 on the control panel 833B (ACT 25).

Processes of ACTs 26 to 30 are processes executed in consideration of changes in waiting states for printing. The processes of ACTs 26 to 30 may be omitted. The processes may also be transitioned from ACTs 25 to 31.

If a "Overall MFP state display" button that is not shown in FIG. 6 is pressed (ACT 26, overall MFP display), the first time calculation unit 21 of the print server 200 collects states of each MFP as in ACTs 2 and 3 of the first embodiment (FIG. 3) (ACT 27), and calculates job waiting times of individual MFPs (ACT 28).

The first time calculation unit 21 transmits the calculated values to the MFP 300B, and the display control unit 33 of the MFP displays the list shown as the example of FIG. 5 on the control panel 833 (ACT 29). The user can check the job waiting times of other MFPs at a present time point.

When the process can be performed by the MFP 300B, the user presses a "Return" button displayed on the control panel 833B. When the "Return" button is pressed, the display control unit 33 returns content displayed on the control panel 833B to the list shown as the example of FIG. 6 (ACT 30).

As in ACT 9 of the first embodiment (FIG. 3), if a job as a printing target is selected by the user and the "Confirm" button is pressed (ACT 31, print job confirmation), the print job designation unit 23 of the print server 200 transmits the designated print job to the MFP 300B which is the MFP designated by the user (ACT 32). The print execution unit 31 of the MFP 300B that receives the print job starts a printing process on the basis of the received print job as in ACT 11 (ACT 33).

Third Embodiment

According to a third embodiment, a configuration without the print server 200, that is, a configuration only with MFPs and PCs will be described. The third embodiment may employ a configuration with a single MFP.

Figure 9:
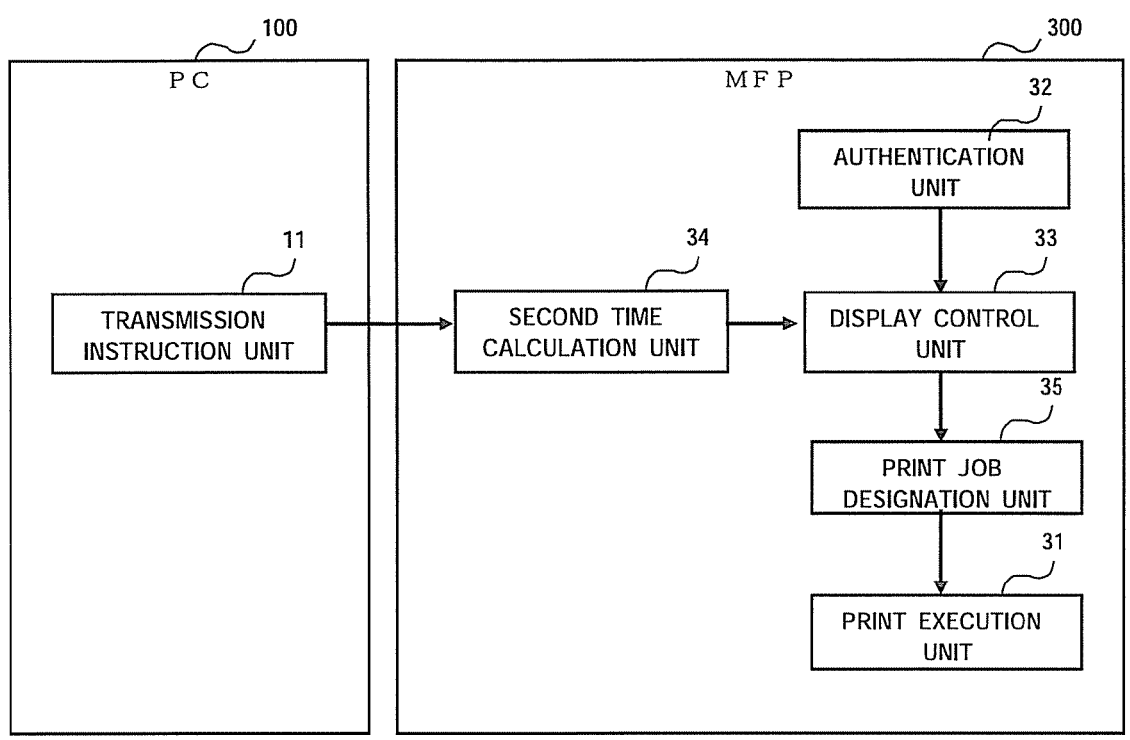
FIG. 9 is a block diagram of a print job management system according to a third embodiment.

FIG. 9 is a block diagram of a print job management system according to the third embodiment. In the third embodiment, a configuration in which the second time calculation unit 34 and the print job designation unit 35 described according to the first and second embodiments are included in the MFP 300 is employed.

Figure 10:
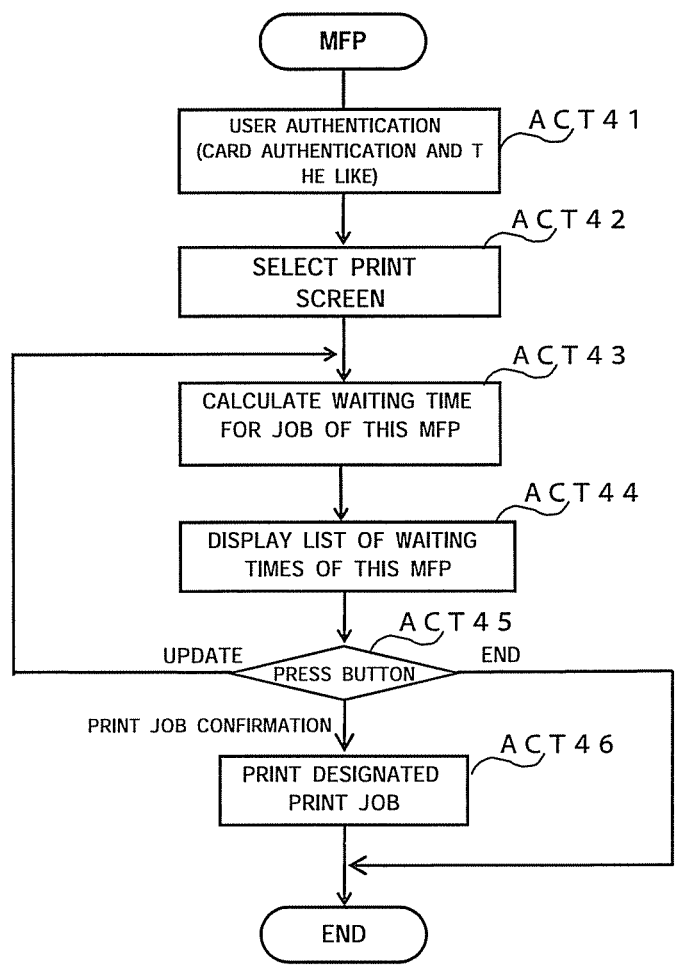
FIG. 10 is a flowchart showing an example of operations of the print job management system according to the third embodiment.

An example of operations of the third embodiment will be described with reference to a flowchart of FIG. 10. Each process shown in FIG. 10 is a process after the transmission instruction unit 11 of the PC 100 transmits the print job to the MFP (in this example, MFP 300B) and is a process performed by the MFP.

The authentication unit 32 performs a user authentication process (ACT 41), and as the user performs a predetermined operation, the MFP 300B sets the mode for printing from among the execution modes for scanning, FAX transmission, printing, and the like (ACT 42).

The second time calculation unit 34 calculates a required time for each print job as in ACTs 6 and 7 of the first embodiment (FIG. 3) (ACT 43), and the display control unit 33 controls the control panel 833B to display the list shown as the example of FIG. 6 (ACT 44). If the user selects a print job on the screen of FIG. 6 and presses the "Confirm" button (ACT 45, print job confirmation), the print job designation unit 35 transmits the selected print job to the print execution unit 31 as in ACT 10 of the first embodiment (FIG. 3), and the print execution unit 31 executes a printing process on the basis of the received print job (ACT 46).

According to the first to third embodiments, on the display of FIG. 5, for example, by changing icons or halftone displays, distinction between MFPs that perform color printing and MFPs that perform only monochrome printing can be displayed. Even when the display of FIG. 6 is performed, for example, by changing icons or halftone displays, distinction between jobs for color printing and jobs for monochrome printing can be displayed.

According to the first to third embodiment, as described with reference to FIGS. 5 and 6, numbers are displayed as the waiting times and the required times, but the invention is not limited thereto. For example, in the display of FIG. 5, the times (the waiting times or the required times) for the MFPs 300A to 300E may be relatively displayed using a bar graph or the like.

In this specification, the CPU or MPU is used as an example of the processor to be realized as hardware resources of the CPU or MPU that cooperate with software resources of the programs. However, an ASIC (Application Specific Integrated Circuit) may also be mounted.

As described above in detail, according to the technique described in this specification, since a time taken until the process of the print job is completed for each image forming apparatus is displayed, convenience for users can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-transitory computer readable medium on which a program is stored, the program is executed on one or more computers, the program comprising:
    acquiring a print job and calculating a processing completion time taken for each of a plurality of image forming apparatuses to complete a process for the print job for each of the image forming apparatuses;
    acquiring the processing completion time for each of the image forming apparatuses and displaying the processing completion time for each of the image forming apparatuses as a list; and
    transmitting the print job to an image forming apparatus selected from among the plurality of image forming apparatuses displayed as the list so as to register the print job.

2. The non-transitory computer readable medium according to claim 1,
    wherein calculating the processing completion times for print jobs queued already and the processing completion time for the print job that is not registered yet for each of the image forming apparatuses, and
    displaying the processing completion times for the print jobs queued already and the processing completion time for the print job that is not registered yet for each of the image forming apparatuses as a list.

3. The non-transitory computer readable medium according to claim 1, further comprising:
    when a plurality of print jobs is acquired, in the image forming apparatus selected from among the plurality of image forming apparatuses displayed as the list, calculating the processing completion time for each of the print jobs; and
    acquiring the processing completion time for each of the print jobs and displaying the processing completion time for each of the print jobs as a list.

4. The non-transitory computer readable medium according to claim 3, further comprising transmitting one or a plurality of print jobs selected from among the plurality of print jobs displayed as the list to the selected image forming apparatus.

5. The non-transitory computer readable medium according to claim 3, wherein displaying each of the print jobs to correspond to information regarding monochrome printing or color printing.

6. The non-transitory computer readable medium according to claim 1,
    wherein acquiring a processing time per unit number of sheets for each of the image forming apparatuses stored in a storage unit, and calculating the processing completion time for each of the image forming apparatuses on the basis of the processing time.

7. The non-transitory computer readable medium according to claim 6, wherein acquiring information that is distinguished the processing time per unit number of sheets between color printing and monochrome printing so as to be stored for each of the image forming apparatuses.

8. The non-transitory computer readable medium according to claim 1, wherein displaying the list by distinguishing between the image forming apparatuses that perform color printing and the image forming apparatuses that perform only monochrome printing.

9. The non-transitory computer readable medium according to claim 1, wherein displaying the list by sorting the image forming apparatuses depending on the processing speed.

10. A non-transitory computer readable medium on which a program is stored, the program comprising:
    acquiring a print job transmitted from a first computer, calculating a processing completion time taken for each of a plurality of image forming apparatuses to complete a processing for the print job for each of the image forming apparatuses, and transmitting the calculated processing completion time to the first computer; and
    transmitting the print job from the first computer to an image forming apparatus selected by a user from among the plurality of image forming apparatuses displayed as a list by the first computer so as to register the print job.

11. The non-transitory computer-readable medium according to claim 10, wherein calculating the processing completion times for print jobs queued already and the processing completion times for the print job transmitted from the first computer for each of the image forming apparatuses.

12. The non-transitory computer-readable medium according to claim 10, further comprising when a plurality of print jobs is transmitted from the first computer, in the image forming apparatus selected from among the plurality of image forming apparatuses displayed as the list by the first computer, calculating the processing completion time for each of the print jobs transmitted from the first computer, and transmitting the calculated processing completion time for each of the print jobs to the first computer,
    wherein transmitting one or a plurality of print jobs selected from among the plurality of print jobs displayed as a list by the first computer to the selected image forming apparatus so as to register the print job.

13. The non-transitory computer-readable medium according to claim 10,
    wherein acquiring a processing time per unit number of sheets for each of the image forming apparatuses stored in a storage unit and calculating the processing completion time for the print jobs for each of the image forming apparatuses on the basis of the processing time.

14. The non-transitory computer-readable medium according to claim 13, wherein acquiring information that is distinguished the processing time per unit number of sheets between color printing and monochrome printing so as to be stored for each of the image forming apparatuses.

15. A print job management method configured by a client computer and a server computer, comprising:
    transmitting a print job, by the client computer;
    acquiring the transmitted print job and calculating a processing completion time taken for each of a plurality of image forming apparatuses to complete a process for the print job for each of the image forming apparatus, by the server computer;
    acquiring the processing completion time calculated by the server computer for each of the image forming apparatuses and displaying information regarding the processing completion time for each of the image forming apparatuses as a list, by the client computer; and transmitting, by the server computer, the print job transmitted from the client computer to an image forming apparatus selected from among the plurality of image forming apparatus displayed as the list by the client computer so as to register the print job.

16. The method according to claim 15, wherein the server computer calculates the processing completion times for print jobs queued already and the processing completion time for the print job that is not registered yet transmitted from the client computer for each of the image forming apparatuses, and the client computer displays the processing completion times for the print jobs queued already and the processing completion time for the print job transmitted from the client computer for each of the image forming apparatuses as a list.

17. The method according to claim 15, wherein, when a plurality of print jobs is transmitted from the client computer, in the image forming apparatus selected from among the plurality of image forming apparatuses displayed as the list by the client computer, the server computer calculates the processing completion time for each of the print jobs transmitted from the client computer, and the client computer acquires the calculated processing completion time for each of the print jobs and displays the processing completion time for each of the print jobs as a list.

18. The method according to claim 17, wherein the server computer transmits one or a plurality of print jobs selected from among the plurality of print jobs displayed as the list by the client computer to the selected image forming apparatus.

\* \* \* \* \*